US012583777B2

(12) United States Patent
Giesen

(10) Patent No.: US 12,583,777 B2
(45) Date of Patent: Mar. 24, 2026

(54) METHOD AND DEVICE TO OPTIMIZE PLUG FLOW IN AN AEROBIC BIOLOGICAL WASTEWATER TREATMENT REACTOR

(71) Applicant: HaskoningDHV Nederland B.V., Amersfoort (NL)

(72) Inventor: Andreas Giesen, Amersfoort (NL)

(73) Assignee: HaskoningDHV Nederland B.V., Amersfoort (NL)

( * ) Notice: Subject to any disclaimer, the term of this patent is extended or adjusted under 35 U.S.C. 154(b) by 362 days.

(21) Appl. No.: 18/246,049

(22) PCT Filed: Apr. 30, 2021

(86) PCT No.: PCT/EP2021/061455
§ 371 (c)(1),
(2) Date: Mar. 21, 2023

(87) PCT Pub. No.: WO2022/063444
PCT Pub. Date: Mar. 31, 2022

(65) Prior Publication Data
US 2023/0357063 A1 Nov. 9, 2023

(30) Foreign Application Priority Data
Sep. 23, 2020 (CN) .......................... 202022097281.0

(51) Int. Cl.
*C02F 3/12* (2023.01)

(52) U.S. Cl.
CPC ........ *C02F 3/121* (2013.01); *C02F 2203/006* (2013.01); *C02F 2209/02* (2013.01); *C02F 2209/03* (2013.01); *C02F 2209/42* (2013.01)

(58) Field of Classification Search
CPC .... C02F 3/1263; C02F 3/121; C02F 2209/06; C02F 2209/03; C02F 2209/42; C02F 2209/02
(Continued)

(56) References Cited

U.S. PATENT DOCUMENTS

| 4,202,774 A | 5/1980 | Kos |
| 5,021,161 A | 6/1991 | Calltharp |

(Continued)

FOREIGN PATENT DOCUMENTS

| CN | 208751402 A | 11/2018 |
| CN | 209367833 U | 9/2019 |

(Continued)

*Primary Examiner* — Claire A Norris
(74) *Attorney, Agent, or Firm* — Ipsilon USA—NLO

(57) ABSTRACT

The invention relates to a method for the treatment of wastewater in a biological treatment reactor, comprising the steps of (a) introducing wastewater influent at the bottom part of the reactor while simultaneously decanting treated wastewater effluent at the operational water level in the top part of the reactor, (b) an aeration step and (c) a settling step wherein the biomass is allowed to settle; wherein step (a) is performed under vertical plug flow conditions, wherein during step (a) the equal distribution of the influent wastewater across the distributor pipes and/or the degree of plug-flow in the reactor is monitored, and when a suboptimal distribution or a suboptimal degree of plug-flow is detected the influent distributor system and/or effluent decanter system is cleaned by removing fouling and/or blockage.

The invention also relates to a liquid influent system and to an installation for the use in such method for the treatment of wastewater.

11 Claims, 6 Drawing Sheets

(58) Field of Classification Search
      USPC ......................................................... 210/620
      See application file for complete search history.

(56)                        References Cited

U.S. PATENT DOCUMENTS

| | | | | |
|---|---|---|---|---|
| 5,395,527 | A | * | 3/1995 | Desjardins ............ C02F 3/1263 |
| | | | | 210/220 |
| 5,584,996 | A | * | 12/1996 | Petit ....................... B01J 8/1818 |
| | | | | 210/275 |
| 5,599,450 | A | * | 2/1997 | Li ........................... C02F 1/006 |
| | | | | 210/603 |
| 2017/0217787 | A1 | | 8/2017 | Presby |

FOREIGN PATENT DOCUMENTS

| | | | |
|---|---|---|---|
| EP | 3009408 | A1 | 4/2016 |
| JP | S54163782 | U | 5/1978 |
| JP | 07014090 | A2 | 1/1995 |
| WO | 2008/141413 | A1 | 11/2008 |

* cited by examiner

METHOD AND DEVICE TO OPTIMIZE PLUG FLOW IN AN AEROBIC BIOLOGICAL WASTEWATER TREATMENT REACTOR

FIELD OF THE INVENTION

The present invention is in the field of wastewater treatment and relates to a method for the treatment of wastewater in a biological treatment reactor wherein vertical plug-flow conditions are optimized during part of the process. The invention also relates to a liquid influent system and to an installation for the use in such method for the treatment of wastewater.

BACKGROUND OF THE INVENTION

Wastewater treatment typically involves several stages. During primary treatment, heavy solids settle on the bottom of a basin and light oily materials accumulate on the surface of the water. Heavy solids and light oils are removed and the primary-treated wastewater is subjected to further treatment. Such further treatment typically involves biological treatment using microorganisms (MO) that convert the organic pollutants in the wastewater to MO-sludge and remove inorganic pollutants such as phosphates and nitrates. This biological process can take place either anaerobically or aerobically.

A widely applied process for the aerobic treatment of wastewater is called the "conventional activated sludge" (CAS) process. It involves air or oxygen being introduced into a biological treatment reactor which contains purifying biomass, also referred to as "activated sludge", and wastewater. The wastewater is for example screened and optionally primary treated sewage and/or industrial wastewater. The mixed liquor suspended solids (MLSS) develop into a biomass-containing floc, which typically grows in suspended fluffy aggregates, also referred to as "flocs". In a subsequent settling tank (usually referred to as "final clarifier") the biological flocs are allowed to settle, thus separating the purifying sludge from the treated water. The settled sludge is recycled towards the biological process as "return activated sludge" (RAS). To keep the biomass in the treatment reactor at a desired level during biomass growth, periodically part of the RAS is wasted as "waste activated sludge" (WAS). The CAS process is applied in a variety of configurations, comprising one or multiple tanks in parallel or sequential treatment train(s). Such tanks can for example be operated as continuous stirred tank reactor (CSTR), as sequencing batch reactor (SBR) or as plug-flow reactor, in particular a plug-flow reactor under vertical plug flow (VPF) conditions.

Although the CAS process is widely used, an important drawback is that due to its floc-like structure the activated sludge has relatively poor settling characteristics.

A modern method and process for the extensive biological treatment of wastewater is making use of aerobic granular sludge (AGS). Compared to conventional aerobic activated sludge systems like Carrousel®, oxidation ditches and sequencing batch reactors (SBR) in which the aerobic biomass is present as flocculent dispersed matter called activated sludge and containing mainly particles typically smaller than 0.2 mm, in AGS the same type of biomass is forming larger aggregates called granules. These granules have a typical size of 0.2-5 mm and have excellent settling characteristics. These settling characteristics are important, as after the aerobic biological treatment the biomass sludge is separated from the purified water through settling. As AGS settles multiple factors faster than activated sludge, the required treatment reactors are much more compact and often only require 25% of the footprint used by the conventional solutions. Furthermore, energy consumption for the wastewater treatment is up to a factor 2 smaller.

The currently most applied AGS technology is the Nereda® technology developed by Royal HaskoningDHV. This technology makes use of Aerobic Granular Sludge Vertical Plug-Flow reactors (AGS-VPF) in which wastewater is fed in the bottom of the reactor and at the same time purified wastewater is decanted from the top. In these reactors it is important that good plug-flow conditions are achieved while the wastewater flows up, to prevent that untreated wastewater is polluting the decanted purified wastewater. Also the level of plug-flow determines the amount of wastewater that can be displaced every batch in relation to the total reactor volume, the so-called Exchange Ratio (ER), without untreated wastewater being discharged and hence the level of plug-flow is an important parameter determining the compactness of the AGS-VPF reactor.

A biological wastewater treatment using aerobic granular sludge is described in WO 2004/024638. WO 2004/024638 discloses a method for the treatment of wastewater comprising organic pollutants, wherein in a first step the wastewater is brought into contact with sludge granules comprising microorganisms, and in a second step an oxygen-comprising gas is fed to the sludge particles. The method further comprises a third step comprising the settling of the sludge granules and the discharge of wastewater depleted of organic pollutants. During the second step the granules are in a fluidised condition. The process allows for the effective removal of organic pollutants, and of nitrogen compounds and phosphate. Preferably at least part of the nutrient-depleted wastewater is discharged during the feeding of wastewater in the first step.

When the biological wastewater treatment is performed under vertical plug flow conditions using aerobic sludge, both when floc-like sludge is used as in a CAS-VPF process and when granular sludge is used as in a AGS-VPF process, said treatment comprises the following steps. Wastewater influent is introduced at the bottom part of the reactor, while simultaneously decanting treated wastewater effluent at the top part of the reactor. The simultaneous introduction of influent and withdrawal of effluent is performed under vertical plug flow conditions. This step is followed by an aeration step and a settling step wherein the biomass is allowed to settle. Typically the process is performed in cycles: after the settling step, the step of simultaneous introduction of wastewater influent and decanting of wastewater effluent, the aeration step and the settling step are repeated. The aeration step can, depending on the desired removal target for nitrogen and phosphate compounds, comprise periods with extensive aeration, low level of aeration, mixing and periods with intermittent or no aeration.

To obtain proper vertical plug-flow conditions it is essential to equally and well-distribute the wastewater influent across the reactor bottom plus to collect the treated wastewater effluent through equally and well-distributed decanters in the top of the reactor. Of this, especially the distribution at the reactor bottom is important and requires fine-meshed and equal distribution of the wastewater influent across the reactor bottom surface. This distribution can be achieved using different type of distributor systems (also referred to as distributors), but it is important that costs of such distributors is not high.

However, such distributors will foul over time due to debris, particles, grease, fibres, wipes, etc. in the wastewater, as well as through biological fouling. Such fouling will result in a less equal distribution and consequently a lower level of plug flow, resulting in reduced treatment capacity of the AGS-VPF reactor or the CAS-VPF reactor.

Another aspect that leads towards a reduced plug-flow in AGS-VPF and CAS-VPF reactors is that, as these reactors are aerated in part of the reactor cycle operation, air could be entrained or accumulated inside the distributors, also resulting in an un-equal distribution.

Wastewater distributors are also used for other types of biological treatment reactors, e.g. like in anaerobic sludge blanket reactors as described in KR1019950008046. These reactors are especially used in industrial applications where reactor sizes are limited. More importantly, the requirements for distributing the wastewater are less stringent than in aerobic sludge reactors with vertical plug-flow feeding (AGS-VPF and CAS-VPF reactors). In such anaerobic reactors the key aim is to inject and somewhat distribute the wastewater across the reactor bottom so that wastewater is well contacted with the anaerobic granules. Establishing a vertical plug-flow is in these systems not targeted, nor possible, as through introduction of the wastewater through the anaerobic biological conversion gas (mainly methane) is produced that results in mixing—thus preventing a plug-flow—and a three phase separator at the reactor top is used to separate the biomass, treated wastewater and gas. As a consequence, the wastewater distributors used in these different types of biological reactors are not suitable for use in AGS-VPF or CAS-VPF. Also, as anaerobic reactors do not make use of aeration at the reactor bottom, there is no risk that air can accumulate in the distributor resulting in a reduced level of wastewater distribution across the reactor bottom. Because of not so critical distribution compared to AGS-VPF or CAS-VPF reactors, and the limited size of these anaerobic reactors the number of distribution pipes is often just 2-5. To ensure that cleaning of those pipes is possible when a blockage occurs without draining the anaerobic reactor, the pipes are often extended across the reactor wall and have isolation valves and blind flanges, enabling the connection of pumps and cleaning devices during manual maintenance to backflush the distributor. For the larger reactors as used in AGS-VPF or CAS-VPF, that make use of typically 10-75 distribution pipes, such design with many wall ducts, isolation valves and flanges is overly expensive and does not lead to an economic application of AGS-VPF or CAS-VPF. Also, where with anaerobic reactors with just 2-5 distribution pipes each pipe can be equipped with a flow meter to determine equal distribution of the wastewater across the various pipes, this is not economically feasible for an AGS-VPF or CAS-VPF reactor.

Further, the distributors used in the anaerobic reactors do not prevent a reduction of the equal distribution by entrainment/accumulation of gas in the distributors.

CN109231436A describes a wastewater distribution system than can be used in AGS-VPF or CAS-VPF. It consists of water inlet devices that are located at the reactor top. These comprise a water inlet inner channel, a water inlet weir and a water inlet outer channel. A vertical water inlet branch pipe is connected to this channel to transport the wastewater towards the reactor bottom, where horizontal pipes with vertical directed bell mouths at the end are injecting the wastewater into the AGS-VPF or CAS-VPF.

The device of CN109231436A allegedly would have the advantages of being reasonable in structural design, convenient to operate and use, low in running energy consumption, low in later maintenance costs, and high in automation and intelligence degree, and would be able to realize a good contact effect between organic matters and sludge.

However, the device has some very important drawbacks which include the following. Although the device may realize a good contact between organic matter in the wastewater and the AGS or CAS, it is not providing a sufficient level of vertical plug-flow conditions to allow for high-quality treated wastewater. To do so, a large number of bell mouths would be required. this would result in many inlet weirs, water inlet channels and vertical water inlet branches, making the construction not only very complicated but also expensive. For example, to establish a decent level of plug-flow in a reactor with a width/length of only 25×25 m, the number of required vertical branches already amounts to more than 50. Furthermore, many access platforms at the reactor top would be required in order to be able to maintain all these water inlets. Furthermore, the large amount of vertical and horizontal branches have a strong negative effect on the vertical water plug flow due to the wall effects and flow pattern interference. Moreover, air from the aeration phase of the reactor operation will accumulate into the bell mouth and horizontal pipes connected to the vertical branches, resulting in a reduced level of equal wastewater distribution and hence a reduced level of vertical plug-flow. Further it is noted that CN109231436A does not teach the level of plug-flow achieved, nor how this can be monitored or rectified in case fouling occurs.

Also CN207811359 discloses a device to distribute wastewater through a splitter box on top of the reactor connected to vertical branches to the reactor bottom. This device has the same drawbacks as described above for CN109231436A.

There is a need in the art to solve the aforementioned drawbacks of existing VPF-AGS and VPF-CAS processes. In particular, there is a need in the art to obtain optimal vertical plug-flow conditions and to maintain these optimal conditions during the process.

SUMMARY OF THE INVENTION

The present invention relates to a method for the treatment of wastewater in a biological treatment reactor, comprising the steps of:
- (a) introducing wastewater influent at the bottom part of the reactor while simultaneously decanting treated wastewater effluent at the operational water level in the top part of the reactor;
- (b) an aeration step; and
- (c) a settling step wherein the aerobic sludge is allowed to settle;
- wherein step (a) is performed under vertical plug flow conditions achieved by introducing the wastewater influent into the reactor through an influent distributor system comprising one or more distributor pipes, said one or more pipes having nozzle outlets, preferably directed downwards, arranged to provide an equal distribution of influent wastewater across the reactor bottom surface, and discharging the treated wastewater effluent through an effluent decanter system configured to discharge the treated wastewater effluent equally across the operational water level in the top part of the reactor;
- and wherein during step (a) the equal distribution of the influent wastewater across the distributor pipes and/or the degree of plug-flow in the reactor is monitored, and when a suboptimal distribution or a suboptimal degree of plug-flow is detected the influent distributor system and/or effluent decanter system is cleaned by removing fouling and/or blockage.

In particular, when during step (a) a suboptimal distribution of the influent wastewater across the distributor pipes is detected then the influent distributor system is cleaned; when during step (a) a suboptimal degree of plug-flow is detected then the influent distributor system and/or the effluent decanter system is cleaned.

The present invention also relates to a liquid distributor system comprising one or more distributor pipes, said one or more pipes comprising one or more nozzle outlets arranged to provide an equal distribution of influent wastewater across the reactor bottom surface, wherein a vertical vent pipe is connected to each distributor pipe. During operation, the vertical vent extends above the operational water level of the reactor comprising the liquid distributor system in order to release air or oxygen entrained in the corresponding distributor pipe.

The invention further relates to the use of the liquid distributor system according to the invention in a method for the aerobic treatment of wastewater in a vertical plug flow (VPF) biological treatment reactor, in particular the use in a method for the treatment of wastewater according to the present invention.

In addition, the invention relates to an installation for carrying out the method for the treatment of wastewater according to the invention, said installation comprising a reactor with a liquid inlet system at the bottom part of the reactor, a liquid outlet system at the top of the reactor and a gas inlet at the bottom of the reactor, wherein the liquid inlet system comprises one or more distributor pipes, said one or more pipes each comprising one or more nozzle outlets arranged to provide an equal distribution of liquid across the reactor bottom surface, wherein a vertical vent pipe is connected to each distributor pipe, the vertical vent pipe ending above the operational water level of the reactor in order to release air entrained in the distributor pipe. The invention particularly relates to an installation for carrying out the method for the treatment of wastewater according to the invention, wherein the installation comprises a liquid inlet system according to the present invention.

The invention also relates to the use of the installation as defined above in a method for the aerobic treatment of wastewater in a vertical plug flow (VPF) biological treatment reactor, in particular in a method for the treatment of wastewater according to the invention.

The present invention solves aforementioned drawbacks of existing aerobic VPF processes and of liquid distributor systems (also referred to as influent distributor systems) used in such processes. As described above, such distributor systems will foul over time due to debris, particles, grease, fibres, wipes, etc. in the wastewater, as well as through biological fouling. Such fouling will result in a less equal distribution of the wastewater influent, and consequently a lower degree of plug flow and discharge of insufficiently treated wastewater. With the present invention, such fouling can be removed, preferably without emptying the reactor content. In addition, and equally important, the occurrence and level of such unequal distribution can be determined, with cost-effective measures, and corrected before treatment performance is impacted. The invention not only ensures that wastewater can be distributed into a CAS-VPF or AGS-VPF reactor using a cost-effective construction, but importantly also safeguards an optimal distribution of the wastewater influent and optimal plug-flow conditions during AGS-VPF or CAS-VPF reactor operation. This is ensured by monitoring the distribution via individual distribution pipes and/or the achieved plug-flow conditions, and when suboptimal distribution and/or suboptimal plug flow conditions are detected, the distributors are cleaned and/or air that is accumulated in the distributor pipes during normal operation is removed without interrupting the wastewater treatment process or disturbing the performance of it.

The invention is described in detail here below.

BRIEF DESCRIPTION OF THE FIGURES

In FIGS. 1A and 1B a side view of a VPF reactor (1) is shown, said reactor comprising a distributor pipe (3) comprising nozzle outlets (4), connected to a vertical vent pipe (8) and an (optional) endcap (9). Said reactor further comprises an effluent decanter system (5) comprising openings (6) for decanting treated wastewater effluent.

FIG. 1A schematically shows how during step (a) the interface profile between introduced untreated wastewater and the treated wastewater in the reactor develops over time in the method and reactor according to the invention. When time progresses from t1 to t2 and t3, as a result of the vertical plug flow characteristics, the interface profile is regular and moves up. This is shown for t1 in the left part of the figure, for t2 in the middle part of the figure and for t3 in the right part of the figure. At time t3, this profile reaches one or more of the openings (6) of the effluent decanter system (5) (also referred to as overflow weir) and breakthrough starts, through which a part of the untreated wastewater is displaced from the reactor with the treated water.

FIG. 1B shows concentration profile at times t1, t2 and t3 when plug flow conditions are poor.

FIG. 1B schematically shows how the concentration profile develops when the vertical plug-flow characteristics are poor, e.g. because wastewater is being treated through a method, device or reactor not according to the present invention, or because of blockage of several distribution pipes (3) comprising the one or more nozzle outlets, or because of blockage of one or more of the openings (6) of the effluent decanter system (5). The resulting interface profile is irregular, and breakthrough starts at t2.

FIG. 8 further shows an effluent decanter system (5) comprising openings (6).

DETAILED DESCRIPTION OF THE INVENTION

Figure 1A:
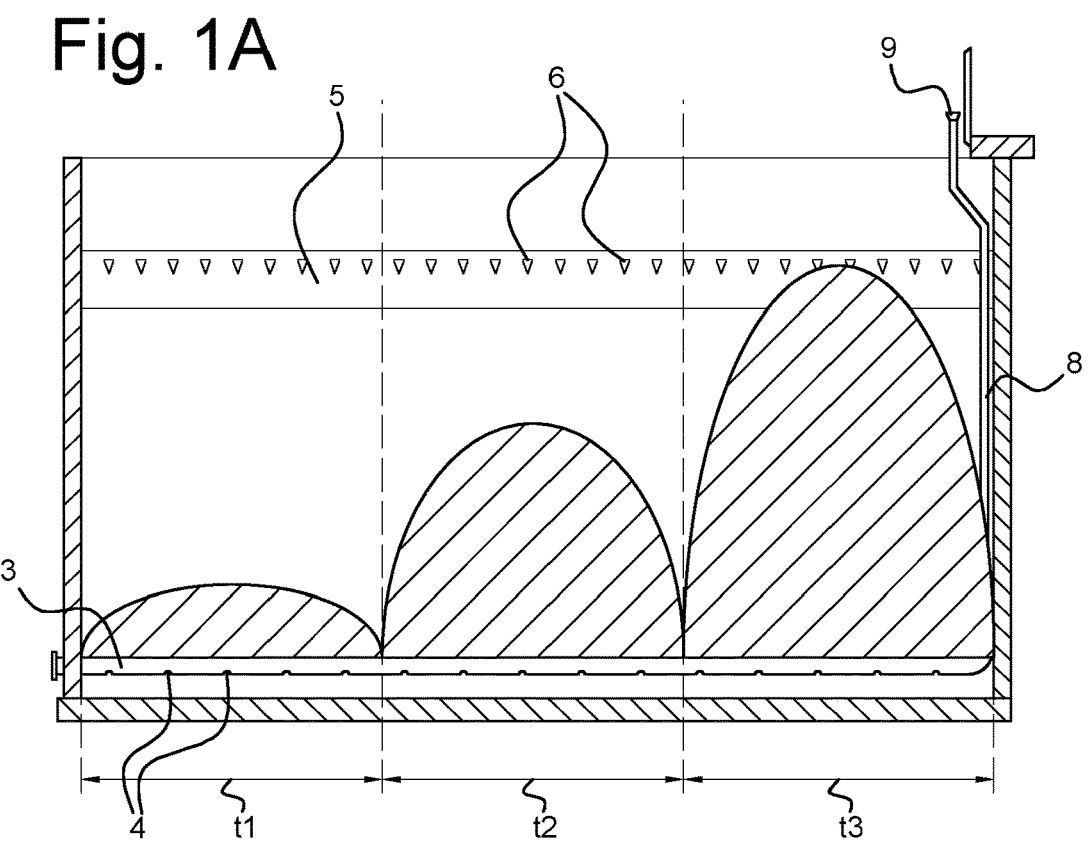
FIG. 1A shows the concentration profile at times t1, t2 and t3 when plug flow conditions are good

The method, device and reactor according to the invention, and preferred embodiments thereof, are presented in more detail below. The skilled person will recognise that, following the same principles, many alternative embodiments can be designed with modified details that achieve the same result and are considered covered by this patent claims as well.

Definitions

The verb "to comprise" and its conjugations as used in this description and in the claims are used in their non-limiting sense to mean that items following the word are included, but items not specifically mentioned are not excluded.

In addition, reference to an element by the indefinite article "a" or "an" does not exclude the possibility that more than one of the element is present, unless the context clearly requires that there is one and only one of the elements. The indefinite article "a" or "an" thus usually means "at least one".

Method for the Treatment of Wastewater

In a first aspect, the present invention relates to a method for the aerobic biological treatment of wastewater. The aerobic biological treatment is performed using aerobic granular sludge comprising microorganisms.

The invention thus relates to a method for the treatment of wastewater in a biological treatment reactor, comprising the steps of:
- (a) introducing wastewater influent at the bottom part of the reactor while simultaneously decanting treated wastewater effluent at the operational water level in the top part of the reactor;
- (b) an aeration step; and
- (c) a settling step wherein the aerobic sludge is allowed to settle;
- wherein step (a) is performed under vertical plug flow conditions achieved by introducing the wastewater influent into the reactor through an influent distributor system comprising one or more distributor pipes, said one or more pipes having nozzle outlets, preferably directed downwards, arranged to provide an equal distribution of influent wastewater across the reactor bottom surface, and discharging the treated wastewater effluent through an effluent decanter system configured to discharge the treated wastewater effluent equally across the operational water level in the top part of the reactor;
- and wherein during step (a) the equal distribution of the influent wastewater across the distributor pipes and/or the degree of plug-flow in the reactor is monitored, and when a suboptimal distribution or a suboptimal degree of plug-flow is detected the influent distributor system and/or effluent decanter system is cleaned by removing fouling and/or blockage.

The invention particularly relates to a method for the treatment of wastewater in a biological treatment reactor, comprising the steps of:
- (a) introducing wastewater influent at the bottom part of the reactor while simultaneously decanting treated wastewater effluent at the operational water level in the top part of the reactor;
- (b) an aeration step; and
- (c) a settling step wherein the aerobic sludge is allowed to settle;
- wherein step (a) is performed under vertical plug flow conditions achieved by introducing the wastewater influent into the reactor through an influent distributor system comprising one or more distributor pipes, said one or more pipes having nozzle outlets, preferably directed downwards, arranged to provide an equal distribution of influent wastewater across the reactor bottom surface, and discharging the treated wastewater effluent through an effluent decanter system configured to discharge the treated wastewater effluent equally across the operational water level in the top part of the reactor;
- wherein during step (a) the equal distribution of the influent wastewater across the distributor pipes and/or the degree of plug-flow in the reactor is monitored, and when a suboptimal distribution or a suboptimal degree of plug-flow is detected the influent distributor system and/or effluent decanter system is cleaned by removing fouling and/or blockage; and wherein when during step (a) a suboptimal distribution of the influent wastewater across the distributor pipes is detected then the influent distributor system is cleaned; wherein when during step (a) a suboptimal degree of plug-flow is detected then the influent distributor system and/or the effluent decanter system is cleaned.

The biological treatment reactor comprises biomass in the form of aerobic sludge, comprising microorganisms. The aerobic sludge may be in a granular form, also referred to as aerobic granular sludge (AGS), or in a floc-like form, also referred to as activated sludge or conventional activated sludge (CAS). The method is performed in a vertical plug flow (VPF) reactor. When AGS is used the biological treatment reactor is also referred to as an AGS-VPF reactor. When CAS is used the biological treatment reactor is also referred to as a CAS-VPF reactor.

In a preferred embodiment of the method according to the invention, 70% or more of the biomass particles in the reactor have a diameter 0.2 mm, preferably a diameter in the range of 0.2-5.0 mm. In this embodiment the aerobic sludge is in the form of AGS. As described above, in this embodiment the biological treatment reactor is also referred to as an AGS-VPF reactor.

In another preferred embodiment of the method according to the invention, 70% or more of the biomass particles in the reactor have a diameter of <0.2 mm. In this embodiment the aerobic sludge is in the form of CAS. As described above, in this embodiment the biological treatment reactor is also referred to as an CAS-VPF reactor.

As described above, the method according to the invention comprises a step (a) wherein wastewater influent is introduced while simultaneously decanting treated wastewater effluent, an aeration step (b), and a settling step (c) wherein the aerobic sludge is allowed to settle.

During step (b) of the process, the aeration step, an oxygen-containing gas is introduced into the reactor. Any oxygen-containing gas can be used, but typical examples include oxygen, air, and mixtures thereof. Most preferably, air is used. Introduction of the oxygen-containing gas occurs via means known in the art, for example via aerators or blowers.

The method according to the invention further comprises a settling step (c). In this settling step the biomass is allowed to settle.

Typically the method is performed in cycles: after settling step (c), the cycle of simultaneous introduction of wastewater influent and decanting of treated wastewater effluent step (a), aeration step (b) and settling step (c) are repeated one or more times. The method according to the invention typically comprises more than one cycle of steps (a), (b) and (c). In a preferred embodiment the process comprises multiple of these cycles.

Figure 3:
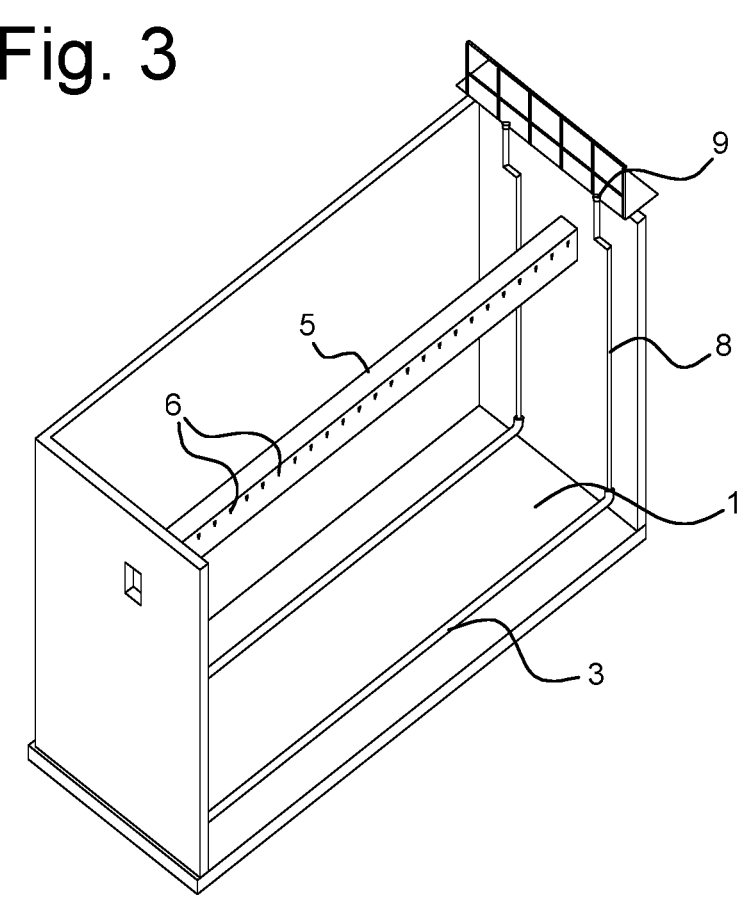

The process according to the invention may comprise additional steps. For example, in another preferred embodiment, the simultaneous decant of treated wastewater effluent at the operational water level in the top part of the reactor in step (a) is stopped when the plug-flow profile interface is near the openings of the effluent decanter system, while the influent introduction at the bottom part of the reactor continues. The operational water level in the reactor will thus increase above the effluent decanter system. After execution of steps (b) and (c), and before executing step (a) of the next cycle, the water level above the effluent decanter system is lowered to the level of the openings of the effluent decanter system, by removing treated wastewater effluent via the effluent decanter system. The effluent decanter system is shown in the Figures. For example FIG. 3 shows the openings (6) of the effluent decanter system (5).

In this embodiment the process comprises the steps of:

(a) introducing wastewater influent at the bottom part of the reactor while simultaneously decanting treated wastewater effluent at the operational water level in the top part of the reactor;

(i) stopping the decanting of treated wastewater effluent when the plug-flow profile interface is near the openings of the effluent decanter system while continuing the influent introduction at the bottom part of the reactor, wherein the water level in the reactor increases above the effluent decanter system;

(b) an aeration step;

(c) a settling step wherein the aerobic sludge is allowed to settle;

(d) lowering the water level in the reactor to the openings of the effluent decanter system, by decanting treated wastewater effluent through the effluent decanter system;

wherein step (a) is performed under vertical plug flow conditions achieved by introducing the wastewater influent into the reactor through an influent distributor system comprising one or more distributor pipes, said one or more pipes having nozzle outlets, preferably directed downwards, arranged to provide an equal distribution of influent wastewater across the reactor bottom surface, and discharging the treated wastewater effluent through an effluent decanter system configured to discharge the treated wastewater effluent equally across the operational water level in the top part of the reactor;

wherein during step (a) the equal distribution of the influent wastewater across the distributor pipes and/or the degree of plug-flow in the reactor is monitored, and when a suboptimal distribution or a suboptimal degree of plug-flow is detected the influent distributor system and/or effluent decanter system is cleaned by removing fouling and/or blockage.

In this embodiment of the method according to the invention, the effluent decanter system is located at a fixed height in the reactor.

In another preferred embodiment, the height of the effluent decanter system within the reactor is variable. In this embodiment, in step (i) of the method, the decanting of treated wastewater effluent is stopped when the plug-flow profile interface is near the openings of the effluent decanter system while continuing the influent introduction at the bottom part of the reactor, wherein the vertical position of the effluent decanter system within the reactor is raised and remains above the operational water level in the reactor. The water level will thus not raise above the effluent decanter system, but the height, i.e. the vertical position, of the effluent decanter system in the reactor is raised to remain above the decanting level. This may be achieved by using for example floats on the decanter or mechanical levers controlled by the operating water level. In step (d) of this embodiment the vertical position of the effluent decanter system is brought back to the original position during step (a) and by doing so the water level in the reactor is lowered to the openings of the effluent decanter system, by decanting treated wastewater effluent through the effluent decanter system.

In another embodiment, floating decanters or decanters with mechanically adjustable height position are used and the flow of the simultaneous decant is reduced when the development of the plug-flow profile is such that the remaining influent cannot be decanted at the feeding rate without reaching the openings (6) within the remaining feeding time. Subsequently, the operating water level in the reactor will increase.

Also in these embodiments, when during step (a) a suboptimal distribution of the influent wastewater across the distributor pipes is detected then the influent distributor system is cleaned; wherein when during step (a) a suboptimal degree of plug-flow is detected then the influent distributor system and/or the effluent decanter system is cleaned.

In another embodiment step (d) may be combined with step (a).

In a variant of the method for the treatment of wastewater, floating decanters, decanters with mechanically adjustable height position or decanters that can be submerged below the water surface are used, and in step (a) no simultaneous decant is applied so the operating water level raises. After execution of steps (b) and (c), in the next cycle the height of the effluent decanter is lowered to normal level during the beginning of step (a) or in preceding step (d) in which effluent is decanted but no influent is being introduced.

In step (a) of the method according to the invention, wastewater influent is introduced at the bottom part of the reactor while treated wastewater (also referred to as wastewater effluent, treated wastewater effluent or effluent) is simultaneously decanted at the operational water level in the top part of the reactor. The bottom part of the reactor herein refers to the lower part of the reactor. The wastewater influent is typically introduced at a height of 30 to 800 mm from the reactor bottom, preferably at a height of 50 to 750 from the reactor bottom, more preferably at a height of 60 to 500 mm from the reactor bottom, even more preferably at a height of 80 to 300 mm from the reactor bottom and most preferably at a height of 100 to 300 mm from the reactor bottom. The optimal height for the introduction of the wastewater influent will depend on the size of the reactor, in particular on the height of the reactor and the operational water level in the reactor during step (a) of the method. The treated wastewater effluent is decanted in the top part of the reactor, typically at the operational water level in the top part of the reactor, during step (a) of the method.

The wastewater influent is for example sewage and/or industrial wastewater. The wastewater influent is optionally pretreated, for example by a primary treatment in order to remove heavy solids and/or light oily materials.

Step (a) of the method according to the invention is performed under vertical plug flow conditions. Vertical plug flow conditions are achieved by an equal distribution of the wastewater influent across the reactor bottom surface, and by simultaneously discharging treated wastewater effluent equally along the water surface at the operational water level during step (a) at the top of the reactor. This results in a vertical plug-flow of wastewater influent displacing treated wastewater effluent by decanting the latter at the reactor top.

Equal distribution of the wastewater influent along the bottom of the reactor is achieved by introducing the influent into the reactor through an influent distributor system comprising one or more distributor pipes, said one or more pipes each having one or more nozzle outlets. The nozzle outlets are preferably directed downwards. The optimum number of nozzle outlets depends amongst others on the size of the reactor, in particular on the surface area of the reactor bottom. Preferably, there are 0.5 to 50 nozzle outlets per m$^2$ of the reactor bottom surface. These nozzles are typically distributed equally across the reactor bottom surface in order to provide an equal distribution of influent wastewater across said surface. In an embodiment there are 0.25-50 nozzle outlets, in another embodiments 0.25-25 nozzle outlets, per m$^2$ of the reactor bottom surface.

In a preferred embodiment, the influent distributor system comprises two or more distributor pipes. The optimum number of distributor pipes depends amongst others on the size of the reactor, in particular on the surface area of the reactor bottom. Preferably the influent distributor system comprises 2 or more distributor pipes, more preferably 3 or more, even more preferably 5 or more. In a typical AGS-VPF reactor or a typical CAS-VPF reactor the influent distributor system comprises to 50 distributor pipes. The plurality of distributor pipes together is also referred to as a distribution grid.

The number of distributor pipes and nozzle outlets is described in more detail below.

In a further preferred embodiment each distributor pipe is connected to a common manifold or header. In a further preferred embodiment, the grid with header are liftable, in other words, the grid with header may be lifted above the operational water level in the reactor.

The treated wastewater effluent is discharged through an effluent decanter system that is arranged to discharge the effluent equally across the surface at the operational water level during step (a). Effluent decanter systems are known in the art.

During step (a) of the method according to the invention, the equal distribution of the influent wastewater across the distributor pipes and/or the degree of plug-flow in the reactor is monitored, and when a suboptimal distribution and/or a suboptimal degree of plug-flow is detected the influent distributor system and/or the effluent decanter system is cleaned by removing fouling and/or blockage. In this respect it is noted that for optimal plug flow conditions, an equal distribution of the influent wastewater across the distributor pipes, and thus an equal distribution across the surface of the reactor bottom, is necessary. Unequal distribution of the influent wastewater across the distributor pipes results in suboptimal plug flow conditions. Similarly, unequal discharge of the treated wastewater effluent across the water surface at the operational water level may also result in suboptimal plug flow conditions.

In one embodiment of the method according to the invention, the equal distribution of the influent wastewater across the distributor pipes is monitored in step (a). In another embodiment of the method according to the invention, the degree of plug-flow in the reactor is monitored in step (a). In yet another embodiment of the method according to invention, both the equal distribution of the influent wastewater across the distributor pipes and the degree of plug-flow in the reactor are monitored. Methods for monitoring of the equal distribution of the influent wastewater across the distributor pipes and for monitoring the degree of plug-flow in the reactor are described in more detail below.

In particular, when during step (a) of the method according to the invention a suboptimal distribution of the influent wastewater across the distributor pipes is detected then the influent distributor system is cleaned; when during step (a) a suboptimal degree of plug-flow is detected then the influent distributor system and/or the effluent decanter system is cleaned.

Methods known in the art for the aerobic biological treatment of wastewater in CAS-VPF or AGS-VPF reactors are performed without such monitoring of the equal distribution of the influent wastewater across the distributor pipes and/or the degree of plug-flow in the reactor, with the disadvantage that it remains unknown whether the method is performed under optimal plug flow conditions or not. As a consequence it remains undetected when these methods run under suboptimal plug flow conditions resulting in decline of treated water quality, and no actions will be undertaken to improve these conditions.

When during step (a) the degree of plug flow is monitored, suboptimal plug flow conditions can be detected as follows. Firstly, when the reactor is first taken into operation, or when the reactor is taken into operation after an extensive cleaning of the influent distributor system (also referred to as the distribution grid) and effluent decanter, the amount of wastewater influent that can be fed to the reactor in step (a) before breakthrough of pollutants or temperature occurs is determined. This amount is referred to as the initial amount of wastewater influent, and represents optimal (ideal) plug flow conditions. Secondly, during the continued operation of the reactor, the amount of wastewater influent that can be added to the reactor in step (a) before breakthrough of pollutants or temperature occurs is determined. The amount of wastewater influent monitored during the continued operation of the reactor is compared to the initial amount of wastewater influent. If the monitored amount of wastewater influent during continued operation is more than 25% lower than the initial amount of wastewater, the plug flow conditions are considered suboptimal. Under optimal plug flow conditions, the monitored amount of wastewater influent during continued operation is at most 25% lower than the initial amount of wastewater, preferably at most 20% lower, more preferably at most 15% lower, even more preferably at most 10% lower, yet even more preferably at most 5% lower and most preferably at most 2% lower. The determination of the amount of wastewater influent that can be fed to the reactor in step (a) before breakthrough of pollutants or temperature occurs is described in more detail below.

When during step (a) of the method according to the invention the equal distribution of the influent wastewater across the distributor pipes is monitored, a suboptimal distribution can be detected by comparing the flow and/or pressure in two or more of the distributor pipes to each other. If one or more of the monitored distributor pipes shows a value that deviates more than 25% from the average value for all monitored distribution pipes, the equal distribution is considered suboptimal, i.e. an unequal distribution occurs. When distribution of the influent wastewater across the distributor pipes is equal, the two or more monitored distribution pipes all show values for the flow and/or pressure that deviate at most 25% from the average value of all monitored distribution pipes, preferably at most 20%, more preferably at most 15%, even more preferably at most 10%, yet even more preferably at most 5% and most preferably at most 2%.

Figure 1B:
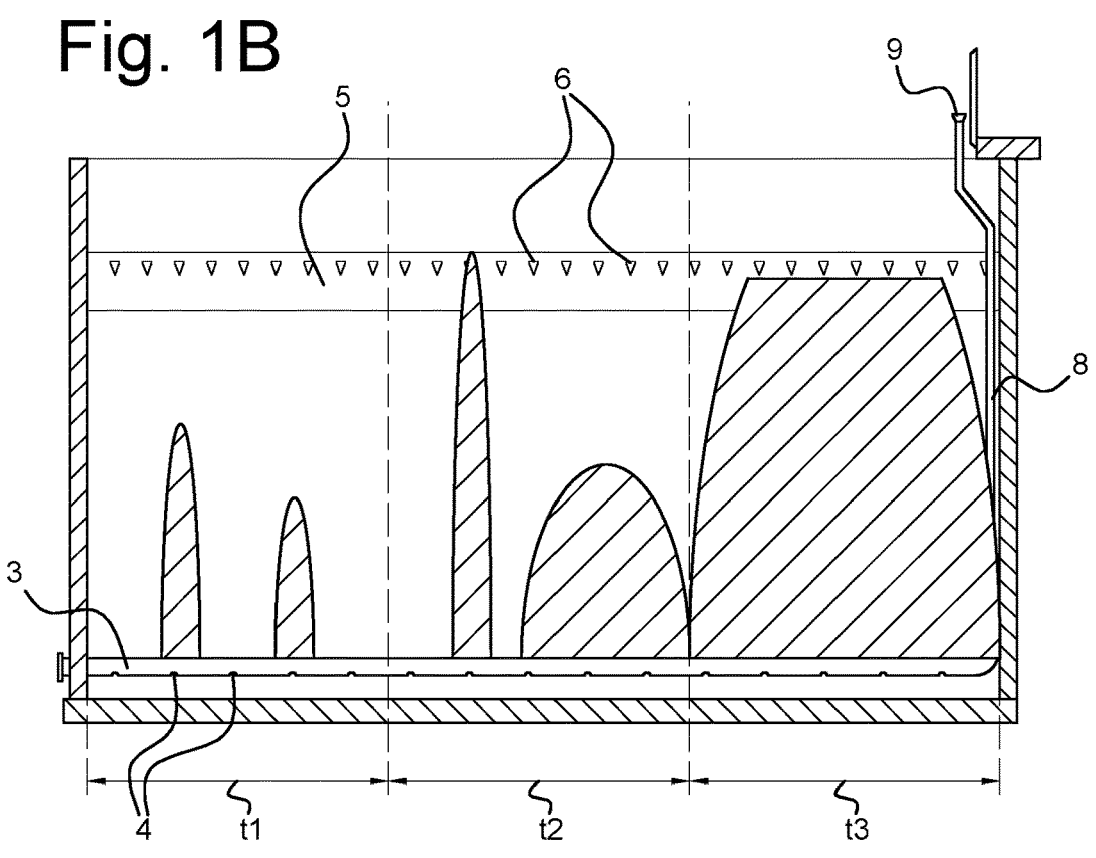
FIG. 1B shows the concentration profile at times t1, t2 and t3 when plug flow conditions are poor.

FIG. 1A shows the concentration profile at times t1, t2 and t3 when plug flow conditions are good and FIG. 1B shows the concentration profile at times t1, t2 and t3 when plug flow conditions are poor. In FIGS. 1A and 1B a side view of a VPF reactor is shown, said reactor comprising a distributor pipe (3) comprising nozzle outlets (4), connected to a vertical vent pipe (8) and an (optional) endcap (9). Said reactor further comprises an effluent decanter system (5) comprising openings (6) for decanting treated wastewater effluent.

A schematic view of optimal plug flow characteristics is shown in FIG. 1A, depicting the concentration profile at times t1, t2 and t3 when plug flow conditions are good. FIG. 1A schematically shows how during step (a) the interface profile between introduced untreated wastewater and the treated wastewater in the reactor develops over time in the method and reactor according to the invention. Wastewater influent is introduced via one or more distribution pipes (3) comprising one or more nozzle outlets (4). When time progresses from t1 to t2 and t3, as a result of the good vertical plug flow characteristics, the interface profile is regular and moves up. This is shown for t1 in the left part of FIG. 1A, for t2 in the middle part and for t3 in the right part of FIG. 1A. At time t3, this profile reaches one or more of the openings (6) of the effluent decanter system (5), also referred to as the overflow weir, and breakthrough starts, wherein a small part of the untreated wastewater is discharged from the reactor together with the treated wastewater effluent.

A schematic view of suboptimal plug flow characteristics is shown in FIG. 1B, depicting a concentration profile at times t1, t2 and t3. FIG. 1B schematically shows how the concentration profile develops when the vertical plug-flow characteristics are poor, for example because wastewater is being treated through a prior art method without monitoring of the plug flow conditions and/or equal distribution of wastewater influent across the reactor bottom, because of severe blockage of one or more distribution pipes (3) comprising one or more nozzle outlets (4), and/or because of blockage of one or more of the openings (6) of the effluent decanter system (5). The resulting interface profile is irregular, and breakthrough already starts at t2.

The method according to the invention is thus characterized by:

the introduction of wastewater to be treated (wastewater influent) into a vertical plug flow reactor, which may be a CAS-VPF or an AGS-VPF reactor, through distributors such that an equal distribution of the wastewater across the reactor bottom is achieved while simultaneously decanting treated wastewater (treated wastewater effluent) at the operational water level at the reactor top, resulting in a vertical plug-flow, while monitoring that an equal distribution of the wastewater across the distributors is achieved and/or that the maximum level of practically feasible plug-flow is achieved, and if suboptimal distribution and/or suboptimal plug-flow are detected to remove fouling, blockage, air entrainment, etc. by cleaning the distributor and/or treated water decanter, and thus safeguarding that the CAS-VPF or AGS-VPF reactor operates at an optimal degree of plug-flow and exchange ratio (ER).

In a preferred embodiment of the method according to the invention, the wastewater influent distributor system comprises two or more distributor pipes. Each distributor pipe comprises one or more nozzle outlets, which are preferably directed downwards. As described above, it is further preferred that 0.5-50 nozzle outlets are present per $m^2$ reactor bottom surface. In a further preferred embodiment the two or more distributor pipes are connected to a common manifold or header.

In an embodiment there are 0.25-50 nozzle outlets, in another embodiment 0.25-25 nozzle outlets, per $m^2$ of the reactor bottom surface.

When during step (a) a suboptimal distribution or a suboptimal degree of plug-flow is detected, the influent distributor system and/or effluent decanter system is cleaned by removing fouling and/or blockage. In particular, when a suboptimal distribution of the influent wastewater across the distributor pipes is detected then the influent distributor system is cleaned; when a suboptimal degree of plug-flow is detected then the influent distributor system and/or the effluent decanter system is cleaned.

In a particular embodiment of the method according to the invention the influent distributor system is cleaned by:

(i) draining the reactor and cleaning one or more of the distributor pipes and their nozzles manually; or (ii) lifting up one or more of the distributor pipes for manual clean; or (iii) inserting an in-pipe cleaning device, for example a pipe pig, cleaning robot or hydrojet, into the header; or (iv) temporarily increasing the flow through the influent distributor system.

When the influent distributor system comprises two or more distributor pipes connected by a manifold or header, it is preferred that said header comprises an entry for a cleaning device.

When cleaning is executed via method (i), the CAS-AGF or AGS-VPF reactor is drained and cleaning the distribution pipe and nozzles manually. Draining the VPF reactor is disadvantageous, therefore cleaning method (i) is not preferred.

When cleaning occurs via method (ii), the one or more distribution pipes are connected to the main pipe or channel with the incoming wastewater by a flexible connection, enabling to lift-up one or more distribution pipes for a manual clean. Draining of the reactor is not necessary and wastewater treatment operation can continue while the uplifted distribution pipes are maintained.

Cleaning method (iii) comprises the insertion of an in-pipe cleaning device into said header or manifold. In-pipe cleaning devices are known in the art. Examples include a pipe pig, a pipe cleaning robot, a hydrojet, etc. For this purpose the header is preferably equipped with one or more isolation valves enabling introducing and removing the cleaning device without the need to drain the reactor.

Figure 8:
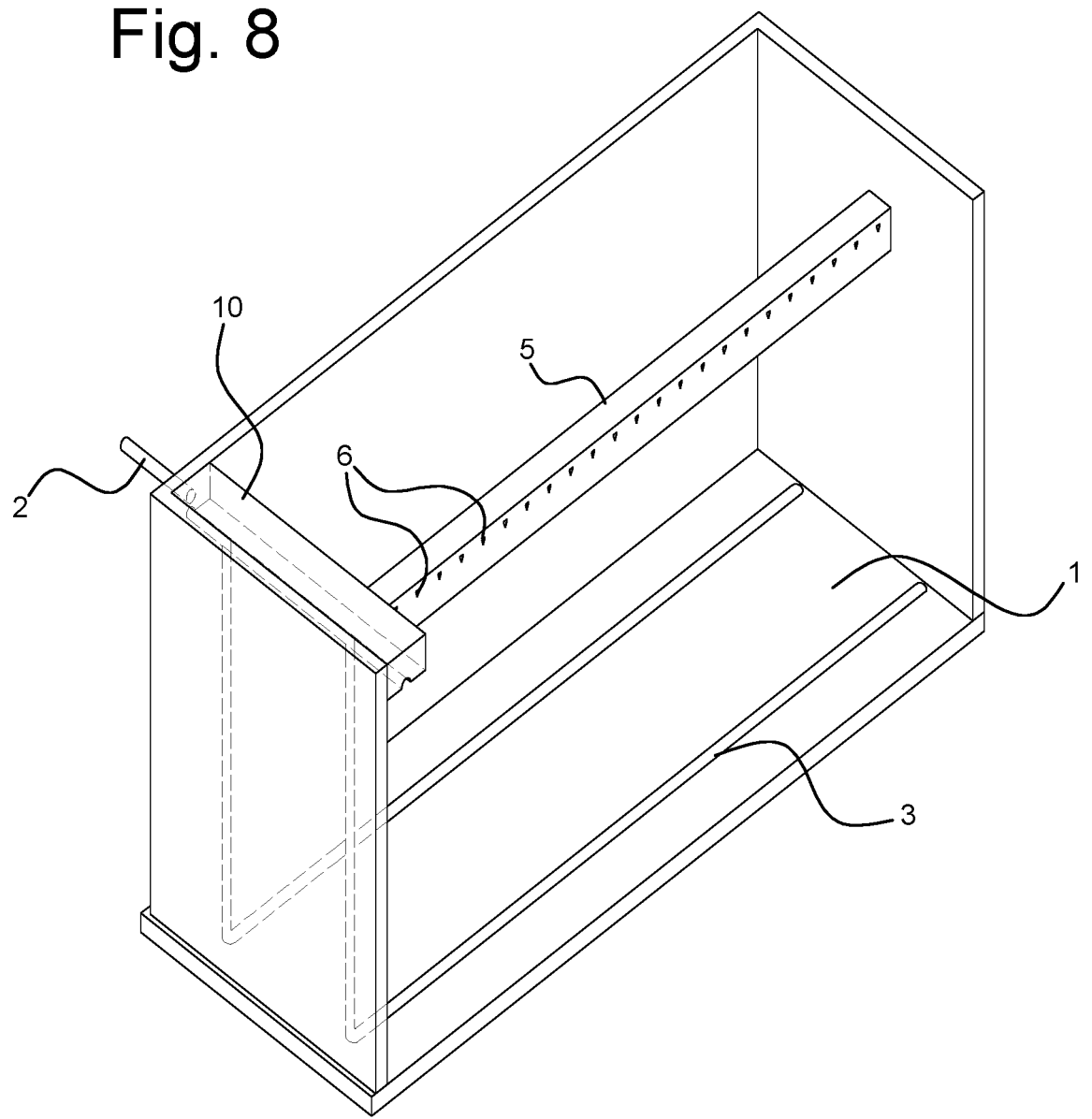
FIG. 8 shows a VPF reactor (1), wherein influent distribution pipes (3) are fed via a header (10). Header (10) is located, at least partly, above the water level in the reactor. Wastewater influent is fed via pipe (2) and header (10) into distributor pipes (3). Cleaning of the distributor pipes (3) may be effectuated from the top side, via header (10).
Figure 9A:
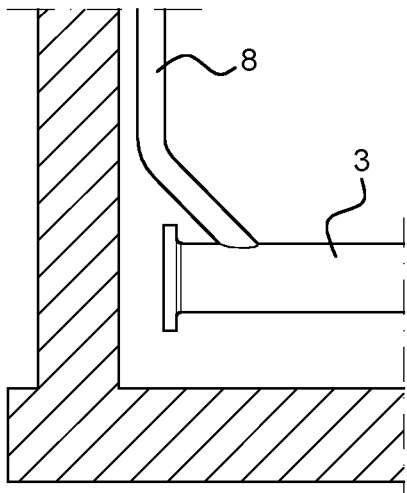
FIG. 9 shows several examples of the connection between vent pipe (8) and distributor pipe (3).
Figure 9B:
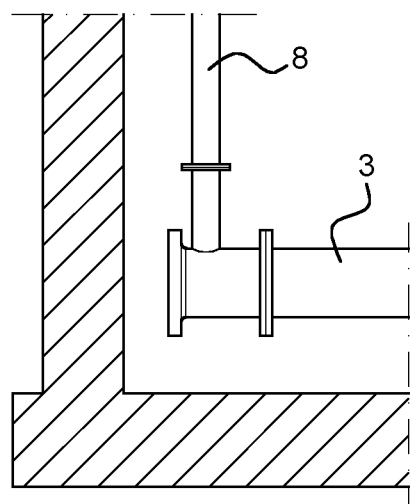
Figure 9C:
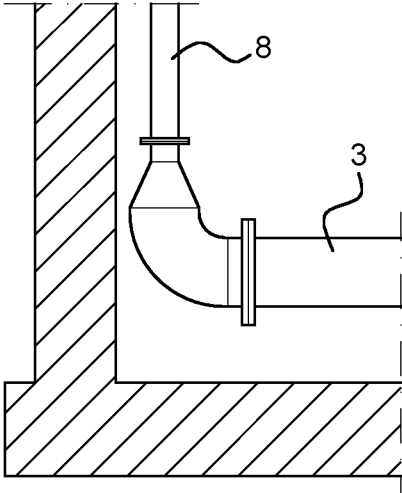
Figure 9D:
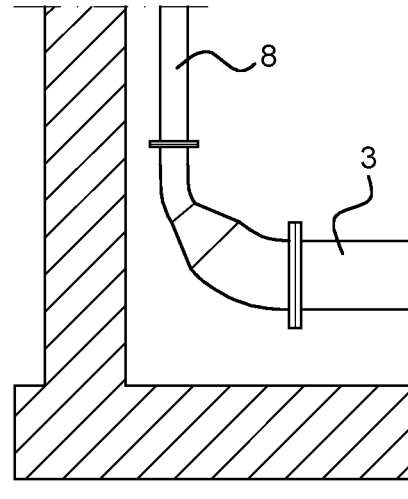

In a variant to this embodiment (FIG. 8), the feed header to which the influent distribution pipes (3) or distribution pipe header is connected to is routed in a way that part of the header is above the water level in the reactor, enabling assessment of the pipe internal without draining the reactor or the need of isolation valves. This embodiment is shown in FIG. 8, wherein influent distribution pipes (3) are fed via a header (10). Header (10) is located, at least partly, above the water level in the reactor. Wastewater (2) is fed via pipe (2) and header (10) into distributor pipes (3). Cleaning of the distributor pipes (3) may be effectuated from the top side, via header (10).

In method (iv) cleaning of the distribution pipes is established by temporarily, for example during 5-30 minutes, increasing the flow through the influent distributor system. Such temporary increase can be effectuated by e.g. temporarily increasing the overall wastewater flow or, more preferably, by closing off one or more of the distributor pipes from the influent distributor system, such that the overall wastewater flow is distributed into the reactor through less distribution pipes.

In a preferred embodiment of the method according to the invention the influent distributor system is cleaned by method (ii), (iii) or (iv), and more preferably by method (iii) or (iv).

Cleaning of the effluent decanter system is typically performed manually, for example by hosing, pressure hosing, raking and/or brushing.

The size of the one or more distributor pipes and the number and size of the nozzle outlets depend on wastewater composition, wastewater flow and reactor size. Typically, the distributor pipe has a diameter between 100 and 1000 mm. The number of distributor pipes depends on wastewater characteristics and VPF reactor size. Smaller reactors may be equipped with only one or two distributor pipes, whereas large reactors may have tens or more than one hundred. In order to ensure that good plug-flow conditions are obtained, the number of distributor pipes in the reactor and the distance between them, and the number of nozzle outlets per distributor pipe and the distance between them is such that the total number of nozzle outlets ranges between 0.5-50 per $m^2$ of reactor bottom surface. The optimum number depends on wastewater characteristics and targeted treated wastewater quality. In an embodiment there are 0.25-50 nozzle outlets, in another embodiments 0.25-25 nozzle outlets, per $m^2$ of the reactor bottom surface.

If two or more distributor pipes are used, these could be connected to a common manifold, also referred to as a header. This header could be located inside or outside the VPF reactor. Connection of the header to the untreated wastewater channel or pump can be through the reactor wall, or by leading one or more pipes over the reactor wall to connect at the reactor bottom to the distributor pipes or to a manifold/header pipe.

In a preferred embodiment of the method according to the invention each distributor pipe is connected to a distributor pipe manifold or header. In another embodiment entrainment and accumulation of air inside the distributor system is prevented by routing the header to which the distribution pipes or distribution pipe header is connected such that part of said header is above the water level in the reactor. The static head in the header prevents entrainment of air into the header. Optionally an entry for a cleaning device is located in the header.

The distribution pipe(s) and nozzle outlets equally distribute the untreated wastewater across the reactor surface during the fill/decant phase of the AGS-VPF or CAS-VPF.

When the nozzle outlets of the one or more distributor pipe are directed downwards, i.e. towards the reactor bottom, the initially downward directed wastewater influent flow is diverted by the reactor bottom into a vertical upflow towards the reactor water surface where it overflows into the treated wastewater effluent decanter which comprises overflow openings and/or weirs. The treated wastewater effluent is discharged as purified wastewater. The number of effluent decanters depends on wastewater characteristics and CAS-VPF or AGS-VPF size. Smaller reactors are equipped with only one or two effluent decanters, whereas large reactors could have ten or more than fifty.

The combination of equal distribution of wastewater influent at the reactor bottom via the one or more distribution pipes and discharge of treated wastewater effluent at the reactor top by well distributed effluent decanters provides for excellent hydraulic plug-flow conditions. This enables that a large portion of the reactor volume can be displaced by the fed untreated wastewater influent without breakthrough of untreated wastewater affecting the quality of the discharged treated wastewater. Depending on the number of nozzle outlets and effluent decanters, typically up to 65-70% of the reactor volume can be displaced (this is the so-called exchange ratio, also referred to as ER) while feeding the reactor with a wastewater flow of 1-10 $m^3$/h per $m^2$ reactor cross surface. For CAS-VPF and AGS-VPFs targeting very stringent effluent demands, or making use of relative shallow reactors with a water height of less than 5 m, this maximum volume replacement prior to breakthrough may be reduced to 40-55%, still being significantly higher than the typically 20-30% obtained in prior art methods.

In a preferred embodiment of the method according to the invention, in step (a) the equal distribution of the wastewater influent across the distributor pipes results in a degree of plug-flow that enables that a minimum of 30% of the reactor volume is displaced towards the treated wastewater effluent decanter system without significant breakthrough of untreated wastewater. More preferably more than 50%, even more than 60% and most preferably more than 70% of the reactor volume is displaced towards the treated wastewater effluent decanter system without significant breakthrough of untreated wastewater.

In a particularly preferred embodiment of the method according to the invention, in the influent distributor system a vertical vent pipe is connected to each distributor pipe, the vertical vent pipe ending above the operational water level of the reactor, in order to release air and/or oxygen entrained in the distributor pipe. Air and/or oxygen (or any other oxygen-containing gas) that is used in aeration step (b) may become entrained in the distributor system during the aeration step. The entrained air and/or oxygen may prevent equal distribution of the wastewater influent across the reactor bottom surface during step (a) of the next cycle of the method according to the invention, which would result in suboptimal plug flow conditions. Therefore it is preferred that entrained air and/or oxygen is removed from the distributor system. By connecting a vertical vent pipe to each distributor pipe of the influent distributor system, the entrained air and/or oxygen is released from the system during step (a).

In a particularly preferred embodiment, the invention thus relates to a method for the treatment of wastewater in a biological treatment reactor, comprising the steps of:
(a) introducing wastewater influent at the bottom part of the reactor while simultaneously decanting treated wastewater effluent at the operational water level in the top part of the reactor;

(b) an aeration step; and (c) a settling step wherein the aerobic sludge is allowed to settle;

wherein step (a) is performed under vertical plug flow conditions achieved by introducing the wastewater influent into the reactor through an influent distributor system comprising one or more distributor pipes, said one or more distributor pipes comprising one or more nozzle outlets, preferably directed downwards, arranged to provide an equal distribution of influent wastewater across the reactor bottom surface, and discharging the treated wastewater effluent through an effluent decanter system configured to discharge the treated wastewater effluent equally across the operational water level in the top part of the reactor; wherein a vertical vent pipe is connected to each distributor pipe of the influent distributor system, the vertical vent pipe ending above the operational water level of the reactor in order to release air and/or oxygen entrained in the distributor pipe;

and wherein during step (a) the equal distribution of the influent wastewater across the distributor pipes and/or the degree of plug-flow in the reactor is monitored, and when a suboptimal distribution or a suboptimal degree of plug-flow is detected the influent distributor system and/or effluent decanter system is cleaned by removing fouling and/or blockage.

When a suboptimal distribution of the influent wastewater across the distributor pipes is detected then the influent distributor system is cleaned; when a suboptimal degree of plug-flow is detected then the influent distributor system and/or the effluent decanter system is cleaned. Also in this embodiment the method may comprise additional steps, as described in more detail above. In particular, the method according to this embodiment may further comprise steps (i) and (d) as described in more detail above. The method may comprise one or more cycles.

In this particularly preferred embodiment, i.e. when the method according to the invention is performed with a distributor system wherein a vertical vent pipe is connected to each distributor pipe of the influent distributor system, cleaning of a distributor pipe is preferably performed by inserting a high pressure lance, or an alternative mechanical or hydromechanical device for pipe-cleaning, into the vent tube. This is described in more detail below. Mechanical or hydromechanical devices for pipe-cleaning are known in the art, and include for example pipe cleaning robots, power-rodding devices, snakes and the like.

Figure 2:
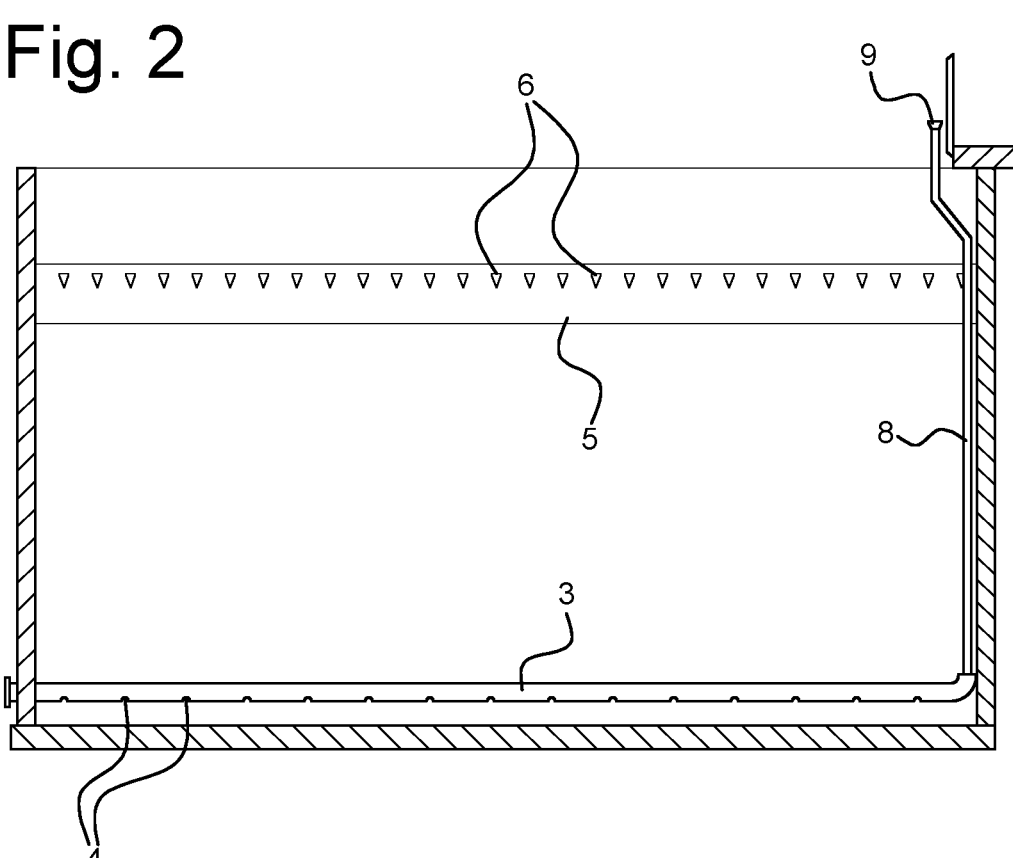
FIGS. 2, 3 and 4 show a reactor comprising an influent distributor system according to the present invention.
Figure 4:
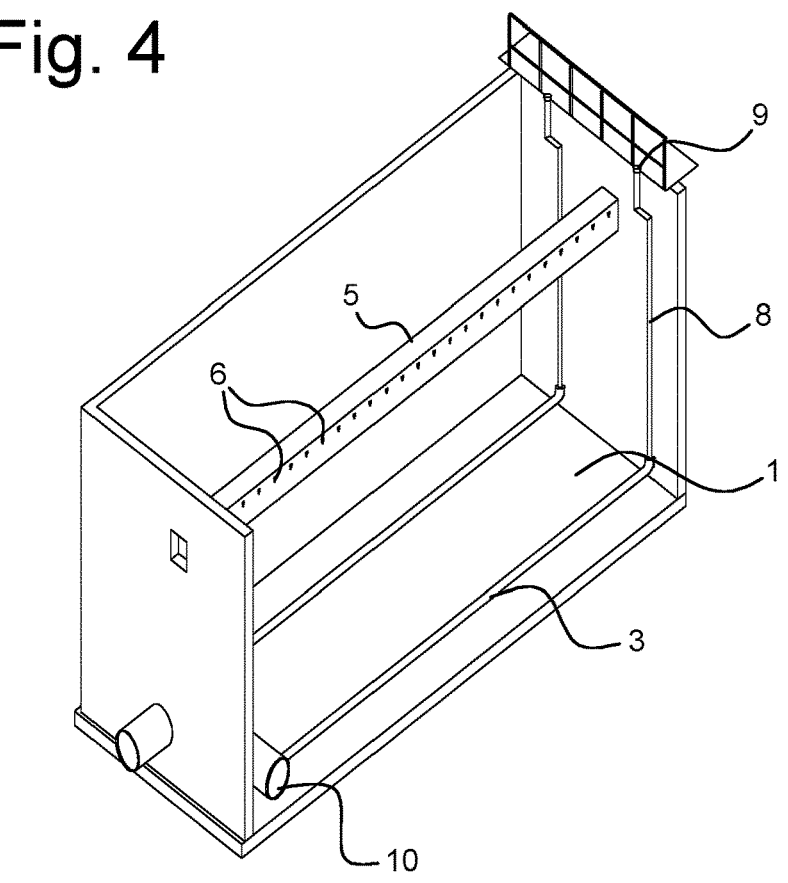

Examples of an influent distributor system as applied in this embodiment of the method according to the invention is shown in FIGS. 2, 3 and 4.

FIGS. 2, 3 and 4 show various cross views of a vertical plug flow reactor (1) in which untreated wastewater is fed into to the reactor bottom part through one or more distributor pipes (3) equipped with outlet down-wards directed nozzles (4). As described in more detail above, the number and size of the distributor pipe and the number and size of the nozzle outlets depend on wastewater composition, wastewater flow and VPF reactor size.

If two or more distributor pipes are used, these may be connected to a common manifold or header. This header may be located inside or outside the VPF reactor. Connection of the header to the untreated wastewater channel or pump may be through the reactor wall as depicted in FIGS. 2 and 4, or by leading one or more pipes over the reactor wall to connect at the reactor top to the distributor pipe or a manifold/header pipe (10) as shown in FIG. 8.

A key feature in this preferred embodiment of the method according to the invention is that each distribution pipe (3) of the influent distributor system is equipped with a vertical vent pipe (8) that is extended to well above the operational water level of the CAS-VPF or AGS-PVF. The vent pipes ensure that air that is entrained into the distributor pipes during the aeration phase of the treatment cycle is released. This is very important as such air entrainment would otherwise cause unequal distribution of the wastewater and hence result in significantly reduced plug-flow characterises, lower achievable exchange ratio and larger required reactor volume. Each vent pipe is optionally equipped with a removable endcap (9) with vertical positioned opening or U-type bend with open end (9) to ensure that released air is not resulting in unsafe spraying towards walkways or surroundings. The height of the vent pipe above the reactor water surface depends on the maximum pressure that occurs in the distributor pipe when feeding the maximum designed for water flow.

Another important key-feature is that the vent pipes enable an effective monitoring of the conditions and fouling level or blockage of the distributor pipes. During feeding of the VPF reactor, the pressure in the vent pipes is similar to the pressure in the distributor system, which is higher than the pressure at the reactor bottom. The pressure in the distributor system can be monitored by measuring the water level in the vent pipe, which should be higher than the reactor top water level. If all of the distributor pipes are clean and do not have air entrained the water level in all vent pipes will be similar. If a distributor pipe is fouled or has blocked nozzle outlets, the water level in the corresponding vent pipe will be higher than the others. In accordance with the method of the invention, the water level in the vent pipes is monitored by manually registering or by measuring the water level in the vent pipes. If the level/pressure in one or more of the vent pipes differs from the others, or differs from the value corresponding to a recently cleaned distributor receiving the same flow rate, the equal distribution and consequently the optimal plug-flow conditions are jeopardized. Affected distributor pipe or pipes need to cleaned to safeguard proper plug-flow and wastewater treatment capacity.

Therefore, in a preferred embodiment of the method according to the invention, in step (a) the equal distribution of wastewater influent across the distributor pipes is monitored by measuring one or more of water level, pressure, temperature and/or one or more other suitable parameters in the vent pipes. Other suitable parameters include for example pH, conductivity, turbidity and redox potential.

In a preferred embodiment the vent pipes are equipped with water level meters and/or pressure meters. In a further preferred embodiment these meters are connected to the plant control system that triggers an alarm when pressure/level difference between the vent pipes themselves, and/or or between a vent pipe and a historical value for a clean distributor, is detected.

In another preferred embodiment, and as an alternative to or in addition to flow, pressure or water level, the vent pipes and/or distributor pipes are equipped with a distribution temperature sensing cable (DTS), or a similar sensing instrument, detecting an unequal temperature distribution across the pipe. Similar to flow, pressure or water level such an unequal temperature distribution indicates unequal water distribution across the distribution pipes.

In another (less preferred) embodiment the distributor pipes (as opposed to the vent pipes connected to the distribution pipes) are equipped with pressure meters or flow meters and these meters are used to monitor if an unequal distribution occurs. In this embodiment, in step (a) the equal distribution of wastewater influent across the distributor pipes is monitored through measurement of flow and/or pressure in two or more distributor pipes.

In accordance with the method of the present invention the distributor pipes are cleaned when an unequal distribution of the wastewater influent across the surface of the reactor bottom is detected.

Another key-purpose of the vent pipes (8) in this preferred embodiment is to provide easy access to each distributor pipe for cleaning, in order to remove fouling and/or blockages, if and when required. Such removal of fouling and/or blockages may for example be performed using a high pressure lance, or an alternative mechanical or hydromechanical device, which may be entered through the opening at the top of a vent pipe and moved into the corresponding distributor pipe. High-pressure lances are known in the art, as are alternative mechanical or hydromechanical devices for pipe-cleaning which include for example pipe cleaning robots, power-rodding devices, snakes and the like.

Fouling removed with a high-pressure lance or alternative cleaning device will flow through the nozzle outlets into the AGS-VPF or CAS-VPF and be removed together with the excess sludge at periodic intervals. By doing so, fouling and blockage of the distributor pipes is effectively prevented or easily resolved and will not lead to reduced performance or reduced treatment capacity caused by suboptimal plug-flow characteristics and/or suboptimal exchange ratio. Moreover, such cleaning operation is relatively simple and not time-consuming, and can be performed during normal operation without need to empty or stop the AGS-VPF or CAS-VPF. For smaller reactors, comprising only 1 or 2 distributor pipes, such cleaning is performed while the VPF reactor is in aeration or settling mode. For larger reactors with multiple distributor pipes, cleaning may also be performed during the feed phase.

An additional advantage is that the diameter of the vent pipe only needs to be large enough to allow access of a high-pressure lance or alternative cleaning device, and often amounts to 50-100 mm. The diameter of a vent pipe thus may be much smaller than the diameter of a distributor pipe, resulting in a cost-efficient construction. Moreover, the vent pipe may also be constructed as a flexible pipe or hose, further reducing costs.

In the method according to the invention, during step (a) the equal distribution of the influent wastewater across the distributor pipes and/or the degree of plug-flow in the reactor is monitored, and when a suboptimal distribution or a suboptimal degree of plug-flow is detected the influent distributor system and/or effluent decanter system is cleaned by removing fouling and/or blockage.

By doing so, an equal distribution and optimal plug-flow is safeguarded and the AGS-VPF can be operated at practical maximum feasible exchange ratio, providing maximum hydraulic treatment capacity.

In a preferred embodiment, the equal distribution of the influent wastewater across the distributor pipes is monitored, as described in more detail above.

In another preferred embodiment, the degree of plug-flow in the reactor is monitored. This is described in more detail below.

In another preferred embodiment, both the equal distribution of the influent wastewater across the distributor pipes and the degree of plug-flow in the reactor are monitored.

The degree of achieved plug-flow in the reactor may be monitored by measuring a profile of a suitable parameter during step (a) of the method, across the reactor from bottom to top at different times throughout step (a). In this respect, suitable parameters are parameters that have a different value for the untreated wastewater influent being distributed into the reactor and the treated wastewater effluent that is discharged from the reactor. Suitable parameters include for example the concentration of pollutants like COD (chemical oxygen demand), ammonium and phosphate. In these cases a profile of the concentration of such pollutant may be measured. Additional suitable parameters include for example turbidity, pH, redox potential, conductivity, temperature, etc.

Figure 5:
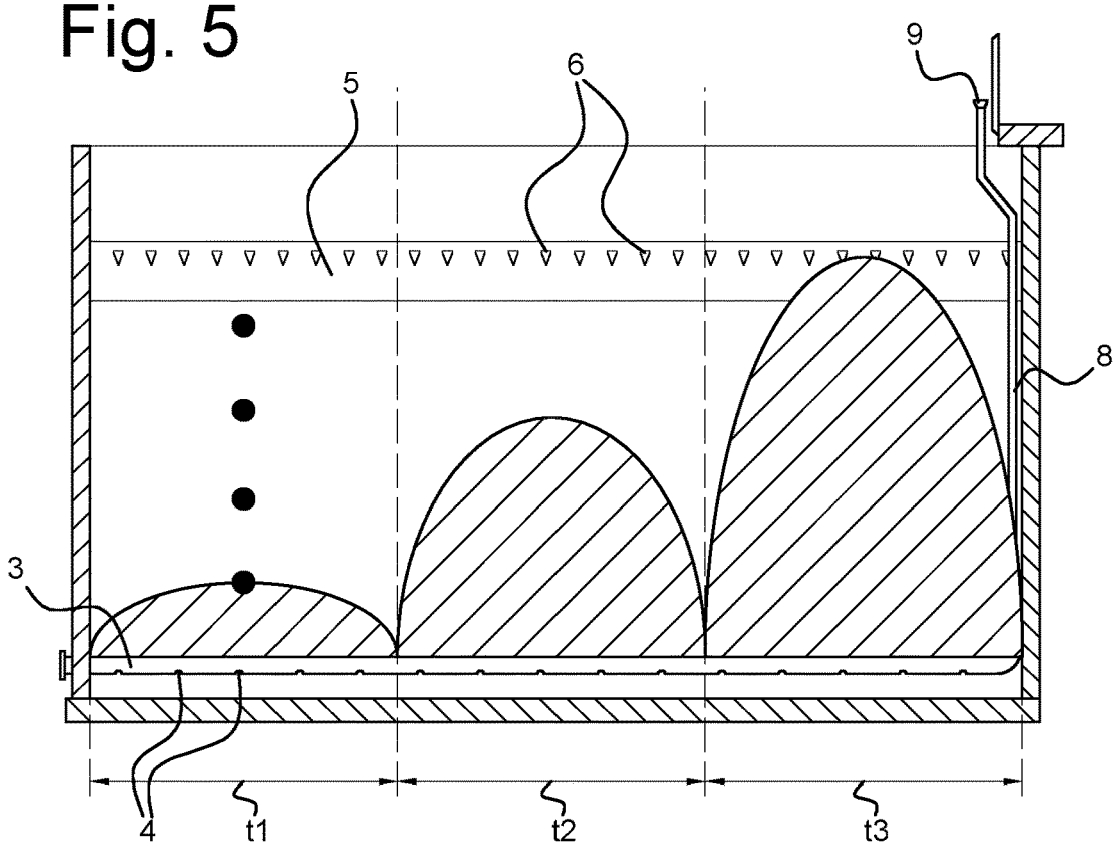
FIG. 5 shows examples of locations across the reactor, from the bottom part to the top part, for measuring of a suitable parameter during step (a) of the method according to the invention. For example, during step (a) samples may be taken manually at these locations in order for said parameter to be determined. Alternatively, said parameter may be determined automatically at these locations.

These profiles show how the interface between introduced wastewater and treated water moves up during the feeding operation. This is illustrated in FIG. 5, showing how a profile is determined by collecting grab water samples and measuring a certain parameter at various sample points at varying heights in the reactor at various time during step (a), and thus monitoring the position of said interface in time and height between introduced wastewater and treated water. Ultimately at a certain time—and corresponding ER—this interface reaches the effluent decanter system and reduces the quality of the discharged water. This method is labour intensive.

In a preferred embodiment of the method according to invention, during step (a) the degree of plug-flow in the reactor is monitored by determining the profile of a suitable parameter across the reactor from the bottom part to the top part of the reactor. The profile of said suitable parameter is preferably determined by measuring said parameter several times during step (a), across the reactor from the bottom part to the top part of the reactor.

This is shown in FIG. 5. A suitable parameter is for example the turbidity, pH, redox potential, conductivity or temperature, or the concentration of a pollutant, preferably chemical oxygen demand (COD), ammonium or phosphate.

Determining a parameter profile may be performed by manually sampling at various times during the reactor feeding operation and using these samples for analysing one or more parameters/concentrations. In a more preferred embodiment one or more parameters are measured on-line by a probe connected to a cable that manually or automatically is moved to different heights in the CAS-VPF or AGS-VPF reactor during step (a). In another embodiment a DTS (distributed temperature sensing) cable or a similar sensor instrument is used to determine the profile across the reactor level.

As described in more detail above, the monitored plug-flow characteristics or ER are compared with those for a non-fouled/non-blocked distribution. Corrective measures are initiated if suboptimal plug-flow conditions are determined. These corrective measures include cleaning of one or more of the distribution pipes and nozzles as aforementioned and/or cleaning of the effluent decanter system, as deteriorated plug-flow conditions may also be caused by an uneven collection of the decanting water across the operational water level surface at the reactor top.

Figure 6:
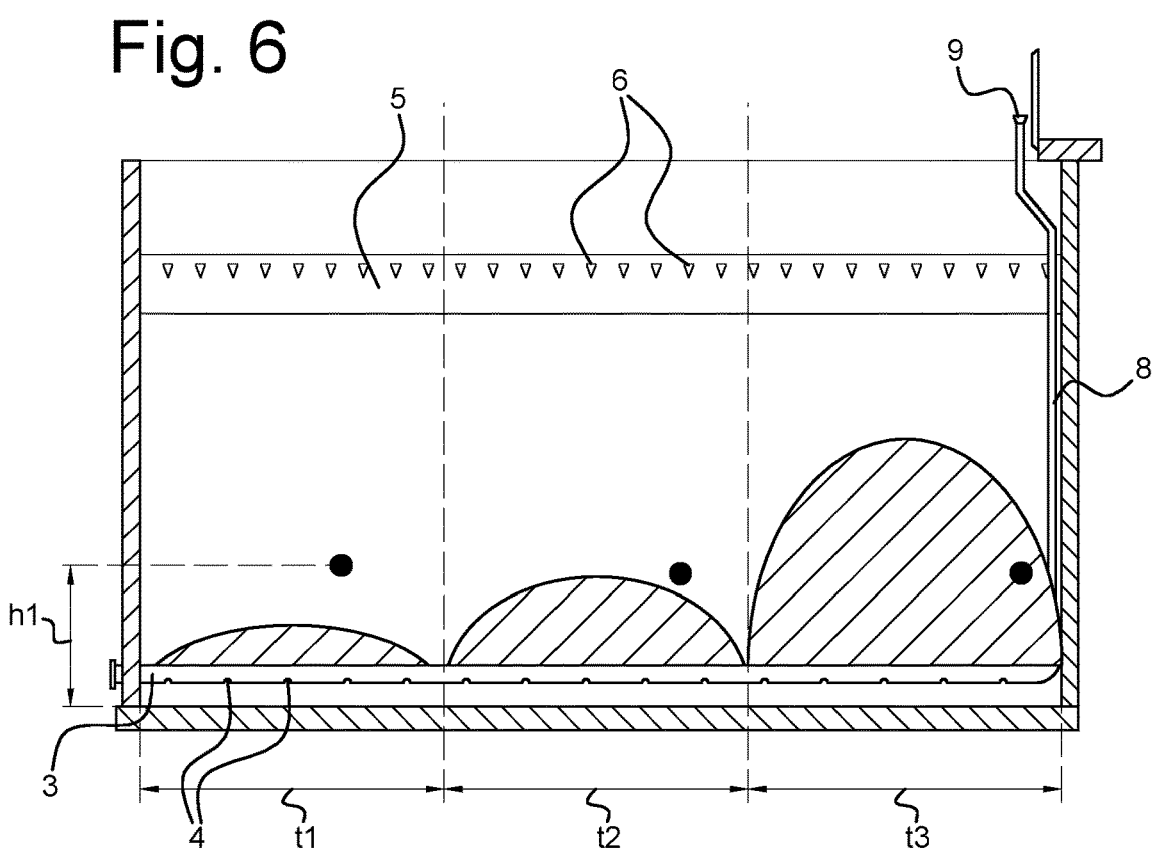
FIG. 6 shows how the profile of a suitable parameter is determined by using analyzers or probes at a certain fixed distance h1, for example a distance of 1 m, from the reactor bottom. As an example, the ammonium concentration may be determined, e.g. by an ion selective probe.

In another preferred embodiment, the plug-flow characteristics are monitored by measuring one or more of the suitable parameters at one or more fixed locations and heights in the reactor. For example FIG. 6 shows how the profile of a suitable parameter is determined by using analyzers or probes, at a certain fixed distance, for example a distance of 1 m, from the reactor bottom. As an example, the ammonium concentration may be determined, e.g. by an ion selective probe. As the concentration of this parameter in the inflowing wastewater is higher than for the treated water being displaced by the plug-flow feeding, the monitoring detects when the interface between introduced wastewater and treated water reaches the probe and the corresponding ER when this happens can be calculated. In this calculation measuring delays such as due to probe reaction times, sample line and processing of samples in the on-line analyser are factored in. In accordance with the method of this invention, the monitored plug-flow characteristics or ER are compared with those for a non-fouled/non-blocked distribution and aforementioned corrective measures initiated if decreased plug-flow is determined.

In another preferred embodiment the parameter is measured near the bottom of the reactor, preferably 0.5-3 m or 0.5-1.5 m from the bottom, as well as near the effluent decant, preferably 0-3 m or 1-3 m below the decant. If the interface is detected by both probes, this enables to distinguish whether the reduced plug-flow is caused by an unequal distribution of the wastewater influent or an unequal discharge of the treated wastewater effluent.

In another preferred embodiment the plug-flow characteristics are monitored by using one or more online measurement instruments located only near the effluent decant, like 0-3 m or 1-3 m below the decant. By doing so, these instruments can also be used to monitor the quality of the discharged treated water.

Figure 7:
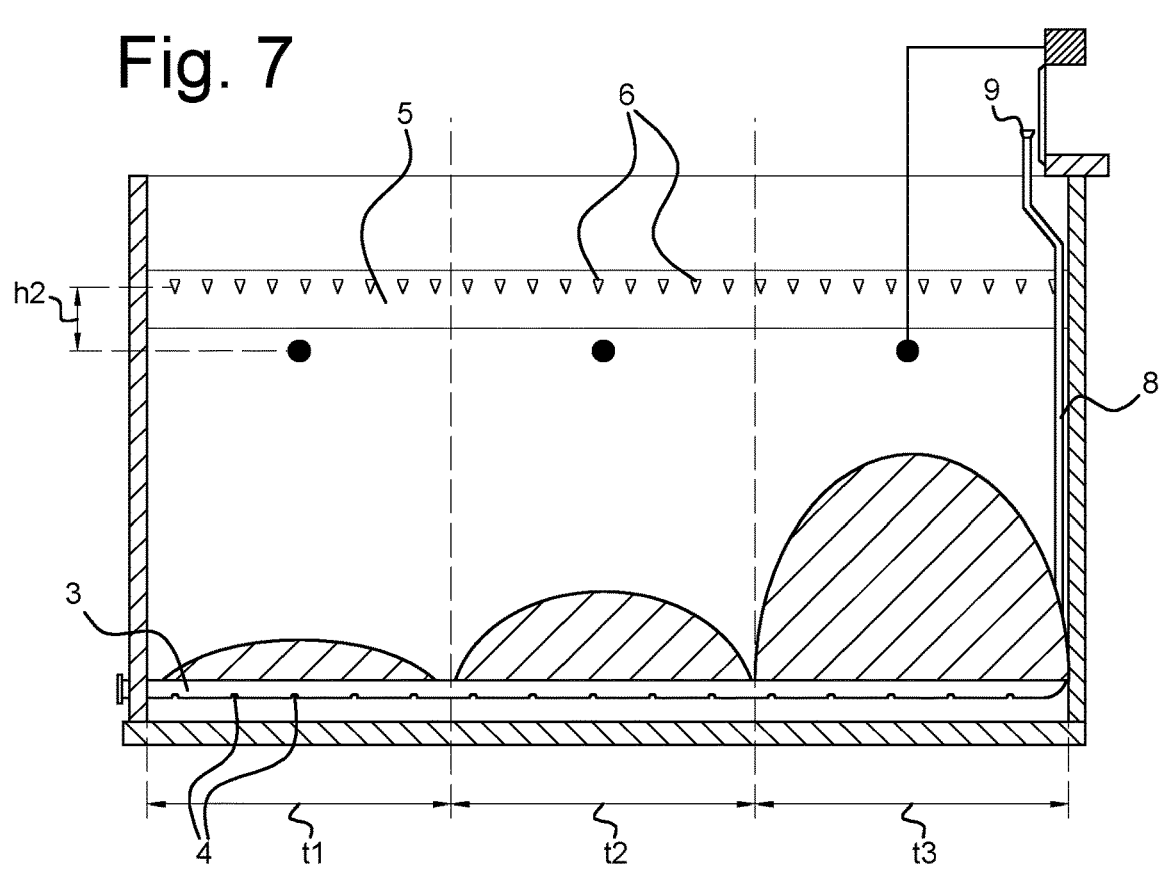
FIG. 7 shows how the profile of a suitable parameter is determined by using probes or analyzers at a certain fixed distance h2, for example a distance of 0-3 m, from the reactor overflow weir openings at the reactor top.

FIG. 7 shows how the profile of a suitable parameter is determined by using probes or analyzers at a certain fixed distance h2, for example a distance of 0-3 m, from the reactor overflow weir openings at the reactor top. For example an ammonium analyser may be used. As the amount of wastewater to be treated can fluctuate strongly during a day and also be affected by rain for treatment plants connected to combined sewers, the location of the instrument is selected such that during maximum flow the interface reaches to or beyond the instrument location. When such maximum flows happen only very infrequently, like less than once per year or less that once per month, periodically, like once per month, the duration of step (a) to the reactor is increased for one cycle to determine at which ER the breakthrough starts or the height of the instrument sample is adjusted for one cycle.

Therefore, in a preferred embodiment of the method according to the invention, the degree of plug-flow in the reactor during step (a) is monitored by measuring one or more suitable parameters at one or more fixed locations in the reactor. Said one or more suitable parameters are for example the concentration of a pollutant (preferably chemical oxygen demand (COD), ammonium or phosphate concentration), turbidity, pH, redox potential, conductivity and/or temperature. When the measuring of the one or more suitable parameters takes place at more than one location in the reactor, said locations may for example be located at different heights of the reactor. Said locations may also be located at the same height of the reactor, for example near the bottom of the reactor or near the effluent decant. In a preferred embodiment the degree of plug-flow is monitored by one or more online measurement instruments located near the effluent decant, preferably 0 to 3 m, more preferably 1 to 3 m below the effluent decanter system. In a further preferred embodiment a DTS cable or a similar sensor instrument is used to determine the profile across the reactor level.

Alternatively, in another preferred embodiment of the method according to the invention, the degree of plug-flow in the reactor during step (a) is monitored by measuring one or more suitable parameters at one or more various locations in the reactor. Said one or more suitable parameters are for example the concentration of a pollutant (preferably chemical oxygen demand (COD), ammonium or phosphate concentration), turbidity, pH, redox potential, conductivity and/or temperature. When the measuring of the one or more suitable parameters takes place at more than one location in the reactor, the one or more parameters may be measured in-line by an instrument connected to a cable that is moved manually or automatically to different heights in the CAS-VPF or AGS-VPF reactor during step (a). In a further preferred embodiment a DTS cable or a similar sensor instrument is used to determine the profile across the reactor level.

The method for the treatment of wastewater in a biological treatment reactor according to the present invention solves aforementioned drawbacks of methods known from the prior art. The method according to the invention not only ensures that wastewater is distributed into CAS-VPF and AGS-VPF reactors by using a cost-effective construction, but also safeguards an optimal distribution of the wastewater influent across the surface of the reactor bottom and thus optimal plug-flow conditions during VPF reactor operation. This is achieved by actively monitoring the wastewater influent distribution across the surface of the reactor bottom and/or the achieved plug-flow conditions. When suboptimal conditions are detected, the distributor pipes are cleaned and/or air accumulated during normal operation is removed from the distributor pipes, preferably even without interrupting the wastewater treatment process or disturbing its performance. The invention effectively removes the drawbacks of the previous state-of-art and enables:

equal distribution of wastewater influent across CAS-VPF and AGS-VPF reactors and obtaining hydraulic excellent vertical plug-flow regime resulting in a performance of the VPF reactor at a maximum capacity, monitoring of the level of achieved distribution of wastewater influent across reactor bottom surface and/or resulting plug-flow conditions, and rectify suboptimal distribution/plug-flow through e.g. fouling, blockage or air accumulation before reactor treatment capacity is affected, preferably without interfering with treatment performance or the need to switch off a reactor; this ensures that distribution and plug-flow is optimized during reactor operation.

reduce VPF reactor volume and construction costs by achieving high exchange ratios prevent that air entrainment in the distributor pipes during the reactor aeration phase results into suboptimal distribution, to be able to resolve fouling or blockage of distributor pipes without the need to stop and empty the AGS reactor, cost-effective construction and reduced maintenance costs.

An equal distribution and optimal plug-flow is thus safeguarded by the method according to the invention. An AGS-VPF or CAS-VPF reactor can thus be operated at a practical maximum feasible exchange ratio, providing maximum hydraulic treatment capacity.

Liquid Distributor System

The invention also relates to a liquid distributor system. A liquid distributor system is herein defined as a device that is used for the introduction of a liquid, preferably an aqueous liquid, into a reactor. The liquid distributor system according to the invention is preferably used for the introduction of a liquid into a vertical plug flow (VPF) reactor, in particular a CAS-VPF reactor or a AGS-VPF reactor used in a method for the aerobic treatment of wastewater. The liquid distributor system is located at or near the bottom surface of the reactor. A liquid distributor system that is used in a method for the aerobic treatment of wastewater according to the invention is also referred to as an influent distributor system.

The present invention thus also relates to a liquid distributor system comprising one or more distributor pipes, said one or more pipes each comprising one or more nozzle outlets arranged to provide an equal distribution of influent wastewater across the reactor bottom surface, wherein a vertical vent pipe is connected to each distributor pipe.

The liquid distributor system according to the invention corresponds to a preferred embodiment of the wastewater influent distributor system that is used in the method for the treatment of wastewater according to the invention. Said method is described in detail above.

The length of the vertical vent pipe depends on the height of the reactor, and more in particular the height of the liquid level during operation of the reactor comprising the liquid distributor system. During operation, the one or more vertical vent pipes of the liquid distributor system have to extend above the operational liquid level of the reactor comprising the liquid distributor system, in order to release air or oxygen entrained in the corresponding one or more distributor pipes. The height of the vent pipe above the reactor liquid surface depends on the maximum pressure that occurs in the distributor pipe when feeding the maximum designed for water flow.

As described above, the vertical vent pipes ensure that air that is entrained into the corresponding distributor pipe during the aeration phase of the treatment cycle is released. This is very important as such air entrainment would otherwise cause unequal distribution of the wastewater and hence result in significantly reduced plug-flow characterises, lower achievable exchange ratio and larger required reactor volume.

The use of the liquid distributor system according to the invention in the method for the treatment of wastewater in a biological treatment reactor according to the invention, as well as several advantages of said method due to the present liquid distributor system, are described in detail above. It is noted that preferred embodiments of the wastewater influent distributor system in the method according to the invention correspond to preferred embodiments of liquid distributor system according to the invention. Several preferred embodiments are described here in more detail.

The connection between the vent pipe and the distributor pipe should be such that air can emit from the distributor pipe, and that it is possible to inject a cleaning device through the vent pipe into the distributor pipe. Cleaning of the distributor pipe via the vent pipe is also described in more detail above. Several options for the connection of vent pipe (8) and distributor pipe (3) are shown in FIG. 9.

In a preferred embodiment of the liquid distributor system according to the invention, the one or more nozzle outlets on each distributor pipe are directed downwards. In another preferred embodiment, the liquid distributor system according to the invention comprises two or more distributor pipes. In another preferred embodiment each distributor pipe in the liquid distributor system comprises two or more nozzle outlets.

As described above for the method according to the invention, the size of the one or more distributor pipes of the liquid distributor system and the number and size of the nozzle outlets on each distributor pipe depend on wastewater composition, wastewater flow and reactor size. Typically, the distributor pipe has a diameter between 100 and 1000 mm. The number of distributor pipes depends on wastewater characteristics and VPF reactor size. Smaller reactors may be equipped with only one or two distributor pipes, whereas large reactors may have tens or more than one hundred. In order to ensure that good plug-flow conditions are obtained, the number of distributor pipes in the reactor and the distance between them, and the number of nozzle outlets per distributor pipe and the distance between them is such that the total number of nozzle outlets ranges between 0.5-50 per m2 of reactor bottom surface. The optimum number depends on wastewater characteristics and targeted treated wastewater quality. In an embodiment there are 0.25-50 nozzle outlets, in another embodiments 0.25-25 nozzle outlets, per m$^2$ of the reactor bottom surface.

Preferably, each distributor pipe of the liquid distributor system is connected to a distributor pipe manifold. Such distributor pipe manifold is also referred to as a header.

It is also preferred that each vent pipe of the liquid distributor system is equipped with a removable endcap with vertical positioned opening or with a U-type bend with open end. The open ended U-bend is to direct potential water spray towards the water surface and away from walkways, access podiums, etc.

In another preferred embodiment of the liquid distributor system, two or more of the vertical vent pipes are bundled in order to reach a same location at the reactor wall, or the access podium, walkway or platform at the reactor top.

As also described above, in the liquid distributor system it is preferred that each vent pipe is equipped with a water level meter, a pressure meter and/or a temperature sensor (preferably a distribution temperature sensing (DTS) cable).

The present invention also relates to the use of the liquid distributor system according to the invention in a method for the aerobic treatment of wastewater in a vertical plug flow (VPF) biological treatment reactor. The present invention particularly relates to the use of the influent distributor system according to the invention in a method for the aerobic treatment of wastewater in a vertical plug flow (VPF) biological treatment reactor according the invention. In a preferred embodiment, the liquid distributor system is used in a method for the aerobic treatment of wastewater in an AGS-VPF reactor or in a CAS-VPF reactor.

The liquid distributor system according to the present invention solves aforementioned drawbacks of existing wastewater distributors. It not only ensures that wastewater can be distributed into a CAS-VPF or AGS-VPF reactor using a cost-effective construction, but also safeguards an optimal distribution and plug-flow during AGS-VPF reactor operation by enabling the monitoring of the distribution of wastewater influent across the reactor surface and by enabling the removal of accumulated air from the distributor pipes during normal operation, without interrupting the wastewater treatment process or disturbing the performance of it.

Installation for Carrying Out a Treatment of Wastewater

The invention also relates to an installation for carrying out the process according to the invention, i.e. the treatment of wastewater in a biological treatment reactor. Said process is described in detail above. The installation comprises a liquid distributor system according to the present invention. Sais liquid distributor system is also described in detail above.

The installation according to the invention comprises a reactor with a liquid inlet system at the bottom part of the reactor, a liquid outlet system at the top of the reactor and a gas inlet at the bottom of the reactor, wherein the liquid inlet system comprises one or more distributor pipes, said one or more pipes each comprising one or more nozzle outlets arranged to provide an equal distribution of liquid across the reactor bottom surface, wherein a vertical vent pipe is connected to each distributor pipe, the vertical vent pipe ending above the operational water level of the reactor in order to release air entrained in the distributor pipe.

It is noted that the installation used in preferred embodiments of the method according to the invention, as described in detail above, corresponds to preferred embodiments of the installation according to the invention. Several preferred embodiments are described here in more detail.

In a preferred embodiment, the liquid inlet system comprises two or more distributor pipes. Preferably each distributor pipe of the liquid inlet system comprises two or more nozzle outlets. It is further preferred that the one or more nozzle outlets in each distributor pipe are directed downwards.

In the installation according to the invention it is preferred that in the liquid inlet system the distance between nozzle outlets in a distributor pipe is in the range of 0.5 to 10 m, and/or wherein there are 0.5 to 50 nozzle outlets per m² of the reactor bottom surface.

Preferably each distributor pipe in the liquid inlet system is connected to a distributor pipe manifold. It is also preferred that each vent pipe is equipped with a removable endcap with vertical positioned opening, or with a U-type bend with open end. In a preferred embodiment each vent pipe is equipped with a water level meter, a pressure meter and/or a temperature sensor, preferably a distribution temperature sensing (DTS) cable.

Preferably, the installation further comprises means for the determination of the profile of a suitable parameter across the reactor from the bottom part to the top part of the reactor. A suitable parameter is for example the concentration of a pollutant (preferably chemical oxygen demand (COD), ammonium or phosphate), turbidity, pH, redox potential, conductivity or temperature. Said means may e.g. be analyzers or probes for determining said parameters. The determination of the profile of a suitable parameter is described in detail above for the method of the present invention, and preferred embodiments described for the method according to the invention equally apply to the installation according to the invention. The installation according to the invention thus preferably comprises analyzers or probes for determining the profile of a suitable parameter. The suitable parameter preferably is the concentration of a pollutant (preferably chemical oxygen demand (COD), ammonium or phosphate), turbidity, pH, redox potential, conductivity and/or temperature The invention further relates to the use of the installation according to the invention in the aerobic treatment of wastewater in a vertical plug flow (VPF) biological treatment reactor. In particular, the installation according to the invention is used in a method for the treatment of wastewater according to the invention.

The present invention has been described above with reference to a number of exemplary embodiments as shown in the drawings. Modifications and alternative implementations of some parts or elements are possible, and are included in the scope of protection as defined in the appended claims.

The invention claimed is:

1. A method for the treatment of wastewater in a biological treatment reactor, comprising the steps of:
   (a) introducing wastewater influent at the bottom part of the reactor while simultaneously decanting treated wastewater effluent at the operational water level in the top part of the reactor, wherein the biological treatment reactor comprises biomass;
   (b) an aeration step; and
   (c) a settling step wherein the biomass is allowed to settle;
   wherein step (a) is performed under vertical plug flow conditions achieved by introducing the wastewater influent into the reactor through an influent distributor system comprising two or more distributor pipes, said two or more pipes comprising one or more nozzle outlets arranged to provide an equal distribution of influent wastewater across the reactor bottom surface, and discharging the treated wastewater effluent through an effluent decanter system configured to discharge the treated wastewater effluent equally across the operational water level in the top part of the reactor; and
   wherein during step (a) the equal distribution of the influent wastewater across the distributor pipes and/or the degree of plug-flow in the reactor is monitored, and when a suboptimal distribution or a suboptimal degree of plug-flow is detected the influent distributor system and/or effluent decanter system is cleaned by removing fouling and/or blockage.

2. The method according to claim 1, wherein in step (a) a vertical vent pipe is connected to each distributor pipe, the vertical vent pipe ending above the operational water level of the reactor in order to release air or oxygen entrained in the distributor pipe, and wherein one or more of the two or more distributor pipes of the influent distributor system is cleaned by entering, at the reactor top, a high-pressure lance, or alternative mechanical or hydromechanical device, through the vent pipe connected to the distributor pipe.

3. The method according to claim 1, wherein the influent distributor system is cleaned by:
   draining the reactor and cleaning one or more of the distributor pipes and their nozzles manually; or
   lifting up one or more of the distributor pipes for manual clean; or
   inserting an in-pipe cleaning device, into the header; or
   temporarily increasing the flow through the influent distributor system.

4. The method according to claim 1, wherein each distributor pipe is connected to a header to form a grid, wherein the grid with header is routed above water level, optionally with an entry for a cleaning device located in the header.

5. The method according to claim 1, wherein during step (a) the degree of plug-flow in the reactor is monitored by determining the profile of a suitable parameter across the reactor from the bottom part to the top part of the reactor, at various times during step (a).

6. The method according to claim 5, wherein the suitable parameter is the chemical oxygen demand (COD), the concentration of ammonium or phosphate, turbidity, pH, redox potential, conductivity or temperature.

7. The method according to claim 2, wherein in step (a) the equal distribution of wastewater influent across the distributor pipes is monitored by measuring water level and/or pressure and/or temperature or other suitable parameter in the vent pipes.

8. The method according to claim 1, wherein in step (a) the equal distribution of the wastewater influent across the distributor pipes results in a degree of plug-flow that enables that a minimum of more than 50% of the reactor volume is displaced towards the treated wastewater effluent decanter system without significant breakthrough of untreated wastewater.

9. The method according to claim 1, wherein more than 70% of the biomass in the reactor have a diameter in the range of 0.2-5.0 mm.

10. The method according to claim 1, wherein the nozzle outlets are directed downwards.

11. The method according to claim 3, wherein the in-pipe cleaning device is a pipe pig, cleaning robot or hydrojet.

* * * * *